United States Patent [19]

Stone

[11] Patent Number: 5,784,555
[45] Date of Patent: Jul. 21, 1998

[54] AUTOMATION AND DIAL-TIME CHECKING OF SYSTEM CONFIGURATION FOR INTERNET

[75] Inventor: Jeremy Daniel Stone, Bellevue, Wash.

[73] Assignee: Microsoft Corporation, Redmond, Wash.

[21] Appl. No.: 634,389

[22] Filed: Apr. 18, 1996

[51] Int. Cl.$^6$ ................................................. G06F 17/00
[52] U.S. Cl. ...................................................... 395/200.5
[58] Field of Search .......................... 395/200.5, 200.59, 395/200.56, 200.34, 200.35, 186, 187.01, 608

[56] References Cited

U.S. PATENT DOCUMENTS

| | | | |
|---|---|---|---|
| 4,104,718 | 8/1978 | Publan et al. | 395/608 |
| 5,243,596 | 9/1993 | Port et al. | 370/94.1 |
| 5,537,645 | 7/1996 | Hensopn et al. | 395/200.59 |
| 5,553,239 | 9/1996 | Heath et al. | 395/200.59 |
| 5,577,209 | 11/1996 | Boyle et al. | 395/187.01 |

*Primary Examiner*—Ellis B. Ramirez
*Attorney, Agent, or Firm*—Klarquist Sparkman Campbell Leigh & Whinston

[57] ABSTRACT

Networking software is configured for connecting to the Internet with a set-up automation software without disturbing the networking software's configuration for connecting to another computer network, such as a corporate local area network. Where installing the TCP/IP network protocol for communicating on the Internet also causes binding to a device configured for connecting to the other computer network, the set-up automation software records whether the TCP/IP network protocol was previously bound to that device and unbinds the TCP/IP network protocol from the device after installing the TCP/IP network protocol if not previously bound to the device. The set-up automation software also unbinds file and printer sharing services from a device used for connecting to the Internet. Where a dial-up device is used for connecting to the Internet, a dial-time security check and configuration check software verifies that the network software is correctly and securely configured for connecting to the Internet. The dial-time check software warns the user and corrects the configuration if the configuration is incorrect or insecure.

22 Claims, 11 Drawing Sheets

AUTOMATION AND DIAL-TIME CHECKING OF SYSTEM CONFIGURATION FOR INTERNET

FIELD OF THE INVENTION

This invention relates to configuring a computer system for accessing the Internet, and more particularly relates to aids for correctly configuring computers to access the Internet.

BACKGROUND AND SUMMARY OF THE INVENTION

Due to the increasing complexity and sophistication of software application programs, there has been a need for tools and procedures that automate performing specialized tasks in these applications. Automation of specialized tasks that are frequently repeated (e.g., setting up a document to have a particular format such as a legal brief in a word processing application or a financial report in a spreadsheet application) is particularly beneficial. Interface programs, known as "Wizards," which control an application program to perform specialized tasks according to user selected options are described in U.S. Pat. No. 5,301,326 to Linnett et al., and now included with many of Microsoft Corporation's application programs.

Another difficult task for computer users is that of properly configuring or setting up application and operating system software for connecting to a computer network such as the Internet. Such configuring involves many variables that depend on the particular computer system and the connection to be used for computer network access. A large proportion of computer users, however, is unfamiliar with computer networking, and also with the details of their own computer system and network access connection. A large number of computer users therefore lack the necessary knowledge to successfully configure their systems for network communication on their own.

Further, even where the computer user has the necessary knowledge, the task of configuring a computer for connecting to the Internet can still be burdensome. For example, experienced computer system administrators generally have many individual computers to configure and maintain. Each computer takes time to configure, and may require configuring differently.

In particular, there are a number of problems that make correctly configuring computers for access to the Internet difficult. First, some configuration operations can affect the configurations of a computer's other network connections. For example, setting up network protocols for an Internet connection in Microsoft Corporation's Windows® operating system can affect the configurations of other network connections. Although most home computers have no other network connections, many computers in businesses are connected to other networks, such as a private corporate computer network. These other network connections often require different configurations than the computer's connection to the Internet. So, modifying the configurations of these other network connections when configuring the Internet connection can adversely affect their performance, or cause them to be inoperative.

Second, some network configurations settings can be a security concern for an Internet connection. For example, enabling file and printer sharing allows files stored at a computer (e.g., on its hard disk) to be accessed from a network by another computer. On a corporate network or other private computer network, this configuration setting allows collaboration between computer users working as a group with a set of files and to share a common printer. However, an Internet connection with this configuration setting can expose the computer's files and printer to access by unknown others while the computer is actively connected to the Internet.

In addition to the problems associated with initially configuring a computer's connection to the Internet, the configuration can be inadvertently or unknowingly changed by the user. Such configuration changes can render the connection inoperative or compromise the computer's security. Often, the user becomes very confused and frustrated when the computer then fails to connect to the Internet, and only a cryptic error message results from the attempt.

The present invention is an automated process and system for configuring a computer to connect to the Internet. In one embodiment of the invention, the automated process and system performs an initial configuration of a computer's connection to the Internet. The automated process and system prompts the user to input information needed in configuring the computer, then proceeds to complete setting the configuration according to the information provided. Since the automated process and system completes the settings, the user is relieved from having to manually set a myriad of configuration settings and from even having to know any details of which settings are made to correctly configure the Internet connection. In the most common case where the Internet connection is a dial-up modem connection to an Internet access server of an Internet service provider, the information provided by the user defines communications parameters of the Internet access server which are obtained by the user directly from the Internet service provider. The user then simply enters the communications parameters without having to know their significance. Thus, the user can configure an Internet connection using the automated process and system without having to configure settings manually or even know which settings to make. Novice and experienced users alike can easily configure an Internet connection in a short time using the invention.

According to a further aspect of the invention, the automated process and system configures an Internet connection without disturbing configurations of any existing connections to other networks (e.g., a corporate network). For configuring operations which affect other existing configurations (e.g., binding communications protocols to the connection), the automated process and system records the original configuration of the other network connections and restores the original configuration after the configuring operation.

According to yet another aspect of the invention, the automated process and system performs security checks to ensure that the Internet connection configuration does not pose an inadvertent security risk. In the illustrated embodiment, the automated process and system checks whether file and printer sharing is enabled for the Internet connection. If so, the automated process and system warns the user of the security risk and prompts the user whether to disable file and printer sharing. The invention thus protects the user from unknowingly setting risky configurations of the Internet connection.

In another embodiment of the invention, the automated process and system checks and corrects the configuration of the computer's connection to the Internet at time of use, e.g., at dial time for a dial-up connection to the Internet. Preferably, the automated process and system checks both that the Internet connection has an operative configuration and also that the configuration does not pose a security risk. Thus, if the user inadvertently changes configuration settings that affect the configuration of the Internet connection (such as by inadvertently removing a needed communications protocol or setting file and printer sharing), the automated process and system corrects the configuration at the time of use to prevent failure of the Internet connection or unknown risk to security. Accordingly, connecting to the Internet is made safer and more robust. As a result, computer support costs to individuals and corporations are reduced.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
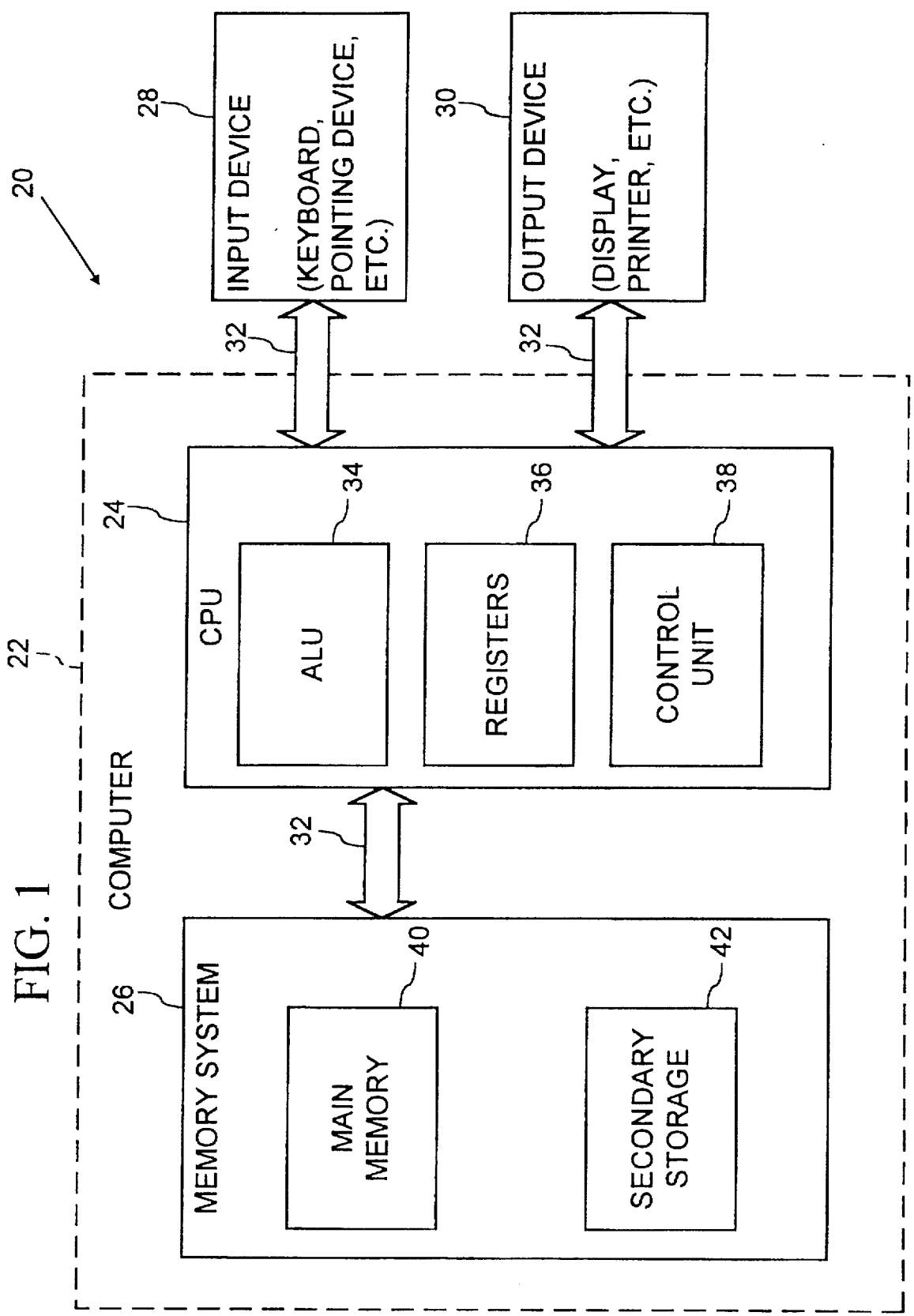
FIG. 1 is a block diagram of a computer system that may be used to implement a method and apparatus embodying the invention for automated and dial-time Internet configuring.

With reference to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Network Software Architecture

Figure 2:
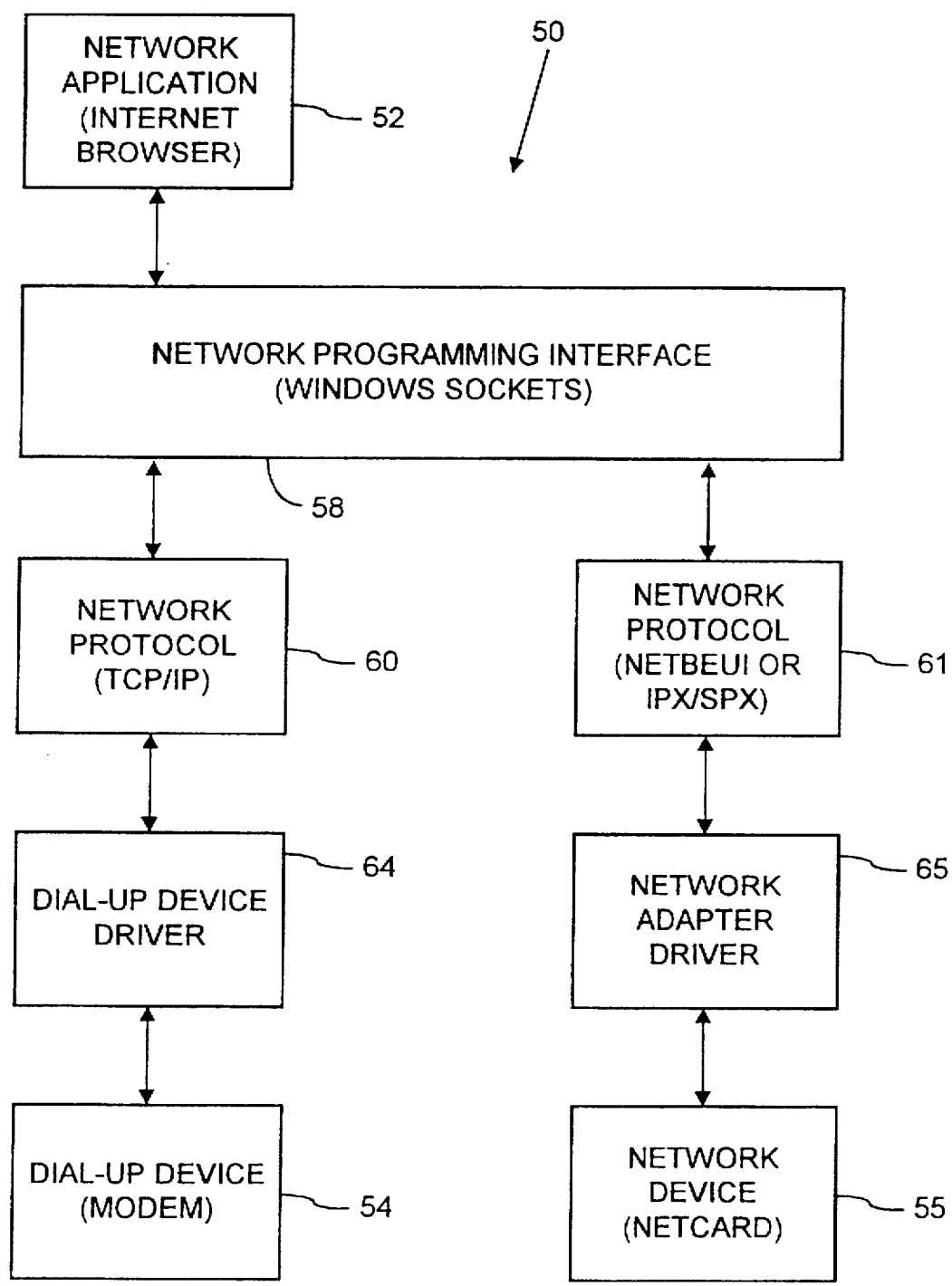
FIG. 2 is a block diagram of one example of a possible network software configuration including a dial-up TCP/IP connection to the Internet and an existing network connection within a computer system such as shown in FIG. 1.

With reference to FIG. 2, an example network software configuration 50 for illustrating the invention utilizes a network software architecture which provides support for networking in the computer system 20 (FIG. 2). In the illustrated embodiment of the invention, the network software architecture is that of the Windows 95 operating system, which is described in Inside Windows 95, by Adrian King, Microsoft Press, 1994, among other references. The network software architecture preferably has a layered structure, that separates networking operations and functionality into distinct modules organized in layers. The layered structure allows a network application 52 (such as an Internet browser application for interactively viewing information from the Internet) at a top layer of the architecture to communicate over a computer network (such as the Internet) via a network hardware device 54–55 at a bottom layer of the architecture without having to itself implement the various networking operations and functionality provided in the intervening layers.

The illustrated network software configuration 50 supports networking with two separate network devices 54–55. Network devices generally are of two types, dial-up connection network devices and dedicated connection network devices. Dial-up devices, such as modems, connect to a remote computer or network by dialing on the public telephone system or like switched communications network. Dedicated connection network devices, such as network adapter cards for Ethernet local area networks (LANs), are directly wired to other computers in a network. The illustrated configuration 50 of the network software architecture includes both a dial-up connection network device 54 (e.g., a modem) and a dedicated connection network device 55 (e.g., an Ethernet LAN network adapter card). Such configuration 50 is commonly used in corporate computing environments where the dedicated connection network device connects the computer with a private corporate network and the dial-up network device is used for connecting to the Internet. As compared to an alternative configuration in which the corporate network includes a remote communications server and the computer connects to both the corporate network and the Internet using a single dedicated connection network device, the configuration 50 with a separate dial-up connection device for connecting to the Internet helps avoid the security risk of exposing the corporate network from access by unknown others on the Internet and avoids consuming corporate network bandwidth for Internet communications.

The network application 52 is an application software program which communicates on the Internet or other computer network. The illustrated network application 52 preferably is an Internet browser application with which a user of the computer system 20 (FIG. 2) interactively accesses and views information from the Internet. Many other network applications 52 also can use the illustrated configuration 50 including, but not limited to, electronic mail and/or news readers, multi-media references and games, tax preparation software, on-line shopping software, etc. which access, update information from, or post information to the Internet. Likewise, the illustrated configuration 50 also allows software applications to communicate over a local network (e.g., a corporate LAN) connected to the dedicated connection network device 55.

The intermediate layers above the network devices 54–55 each provide a packaged set of functions which abstract network communications at decreasing levels of hardware and network specificity for the next higher layer. These intermediate layers in the illustrated configuration 50 include a network programming interface 58, network protocols 60–61, and network adapter drivers 64–65. For expository convenience, FIG. 2 is a top level view of the network software architecture used in the configuration 50. While each of the layers is shown as a separate component, each layer can itself be implemented as more than one separate component or layer.

The network programming interface 58 is the next highest layer under the network application 52. The network application 52 communicates on the Internet or local network by calling application programming interfaces (APIs) of functions in a network programming interface 58. The illustrated network programming interface 58 is a Windows sockets networking programming interface. The Windows sockets 58 comprises a facility or set of services for inter-process communications, e.g., communications over the Internet or other network between a process (such as one associated with the network application 52) on the computer system 20 (FIG. 1) and a process executing on a remote computer. These services are implemented as a set of functions which are callable from a network application 52 using associated application programming interfaces (APIs). The functions are included in a dynamic link library file called WSOCK32.DLL. Dynamic link library files provide function libraries that applications can link to and call using regular function calls. Alternatively, the network programming interface 58 can be implemented using other file names and types.

The Windows sockets 58, in turn, relies on network operations and functionality implemented in lower layers of the network software architecture. At the layer under the Windows sockets 58, the network protocols 60–61 comprise one or more protocol drivers that implement a set of functions which abstract communicating according to established networking protocols for the Windows sockets 52. Network protocols are a set of rules and a prearranged data format defining how two computers communicate on a network. Computers connected to the Internet typically use the Transmission Control Protocol (TCP) and the Internet Protocol (IP) protocol suite to communicate. Corporate often use the NetBIOS Extended User Interface (NETBEUI) of Microsoft Corporation or Novell's IPX/SPX protocols.

TCP/IP is a layered set of protocols which conceptually is stacked vertically into layers. TCP is a transport layer that defines data flow, acknowledges data, and retransmits lost or damaged data. However, the User Datagram Protocol (UDP) is also commonly used as a transport layer in place of TCP. IP is a network layer that defines the format of data, and the basic unit of data transfer. TCP/IP provides a reliable, byte-stream-oriented virtual circuit for data transfer and is well known in the art. There are also application protocols in the Internet protocol suite including File Transfer Protocol (FTP), Simple Mail Transfer Protocol (SMTP), Hyper Text Transfer Protocol (HTTP), Gopher, etc. which use TCP/IP to pass data across the Internet.

As TCP/IP is the default transport/network protocol suite for communications with computers on the Internet, the network protocol 60 configured for the dial-up device 54 used for Internet connection preferably is the TCP/IP protocol, although other network protocols used for communications on the Internet alternatively can be used for the network protocol 60. For example, UDP/IP can be used to provide an unreliable (i.e., no guaranteed delivery of data packets) byte-stream-orientated, connectionless (i.e., no virtual circuit) transport/network protocol suite for data transfer. On the other hand, the network protocol 61 configured for the network device connecting to the local network can be any of various network protocols including, but not limited to, the NetBIOS Extended User Interface(NetBEUI), Internet Packet Exchange/Sequenced Packet Exchange (IPX/SPX), DECnet by Digital Equipment Corporation, NetBIOS by Microsoft Corporation, and OSI/TP-4.

The network adapter drivers 64–65 control the network devices 54–55, respectively. (The term driver commonly is used to refer to a software component that interfaces with hardware.) The network adapter driver 64 configured for the dial-up device 54 comprises one or more drivers that implement functions for connection protocols and for directly controlling the operation of the dial-up device 64 (e.g., modem). The network adapter driver 64 preferably uses the Point-to-Point Protocol (PPP) to connect to the Internet host with the modem. The Serial Line Protocol (SLIP) alternatively can be used. SLIP and PPP allow two computers to communicate using TCP/IP over a standard modem and telephone line dial-up connection, and typically provide full access to the set of available Internet protocols and services. The network adapter driver 65 configured for the network device 55 connecting to the local network directly controls operation of the device 55.

Each of the blocks in FIG. 2 except for the devices 54–55 is typically implemented as a module of code for a set of related functions.

In the following discussion, the term "binding" generally refers to linking together software components (e.g., the network protocols 60–61 with the network device drivers 64–65) so that the components can interface and interoperate, such as by creating a reference for one component to the other in a system registry or the like as described below. The term "unbinding" generally refers to removing the link, such as by deleting the reference.

Configuration and Security Automation

Figure 3:
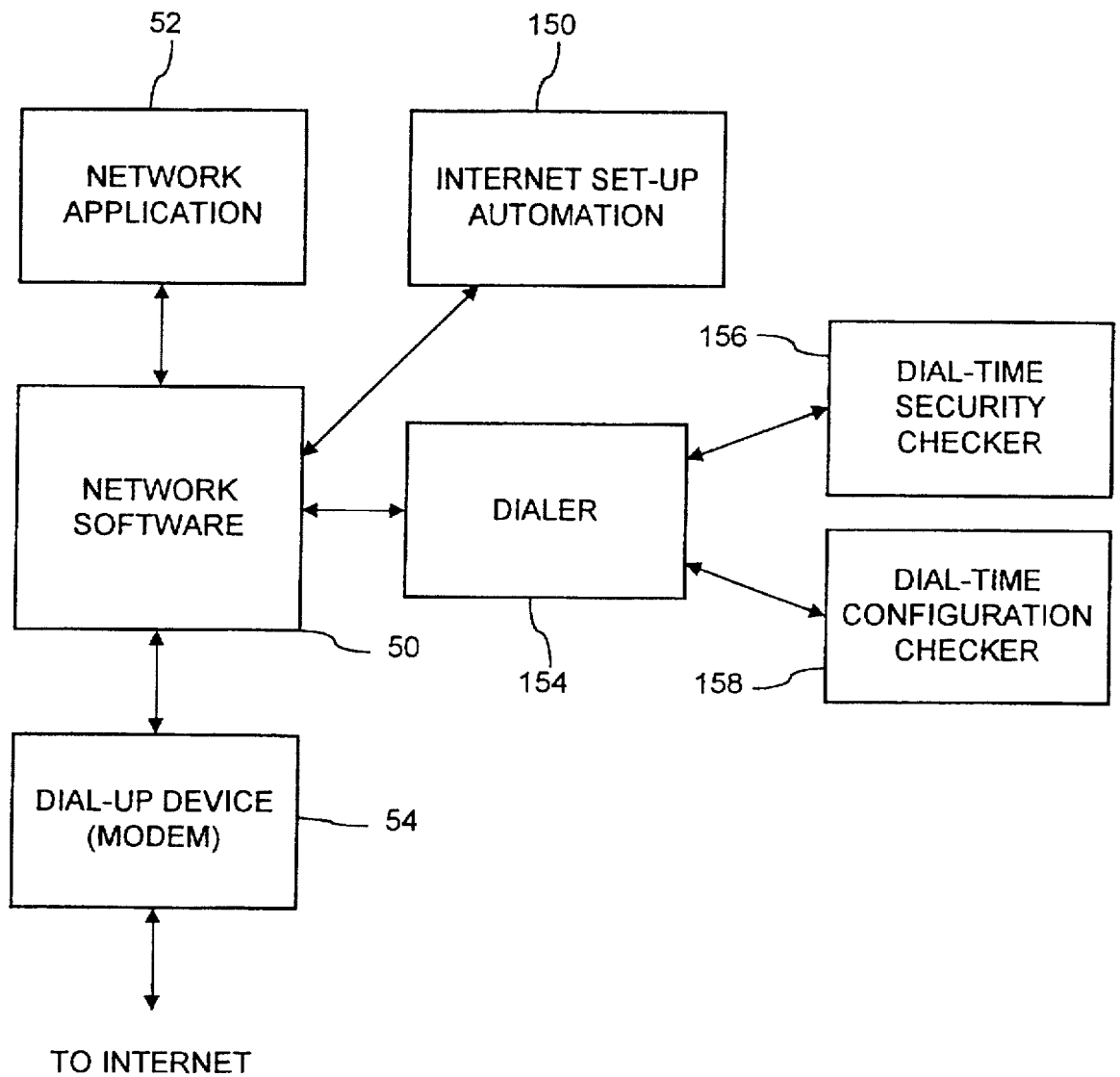
FIG. 3 is a block diagram of an Internet set-up automation, dial-time security checker and dial-time configuration checker for configuring the network software of FIG. 2.

Referring now to FIG. 3, in the illustrated embodiment of the invention, the network software configuration 50 (FIG. 2) is initially configured by an Internet set-up automation software 150. The network software configuration 50 also is checked and corrected if needed by a dial-time security checker 156 and a dial-time configuration checker 158, each time that a dialer 154 associated with the network software dials on the dial-up device 54 (FIG. 2) to connect to the Internet. The operation of the Internet set-up automation software 150, the dial-time security checker 156 and the dial-time configuration checker 158 are next described with reference to the flow charts of FIGS. 4, 5 and 7. The Internet set-up automation software 150, dial-time security checker 156 and dial-time configuration checker 158 can be provided as components of the network application 52, components of the computer's operating system software, or as separate software components.

Internet Set-up Automation

Figure 4:
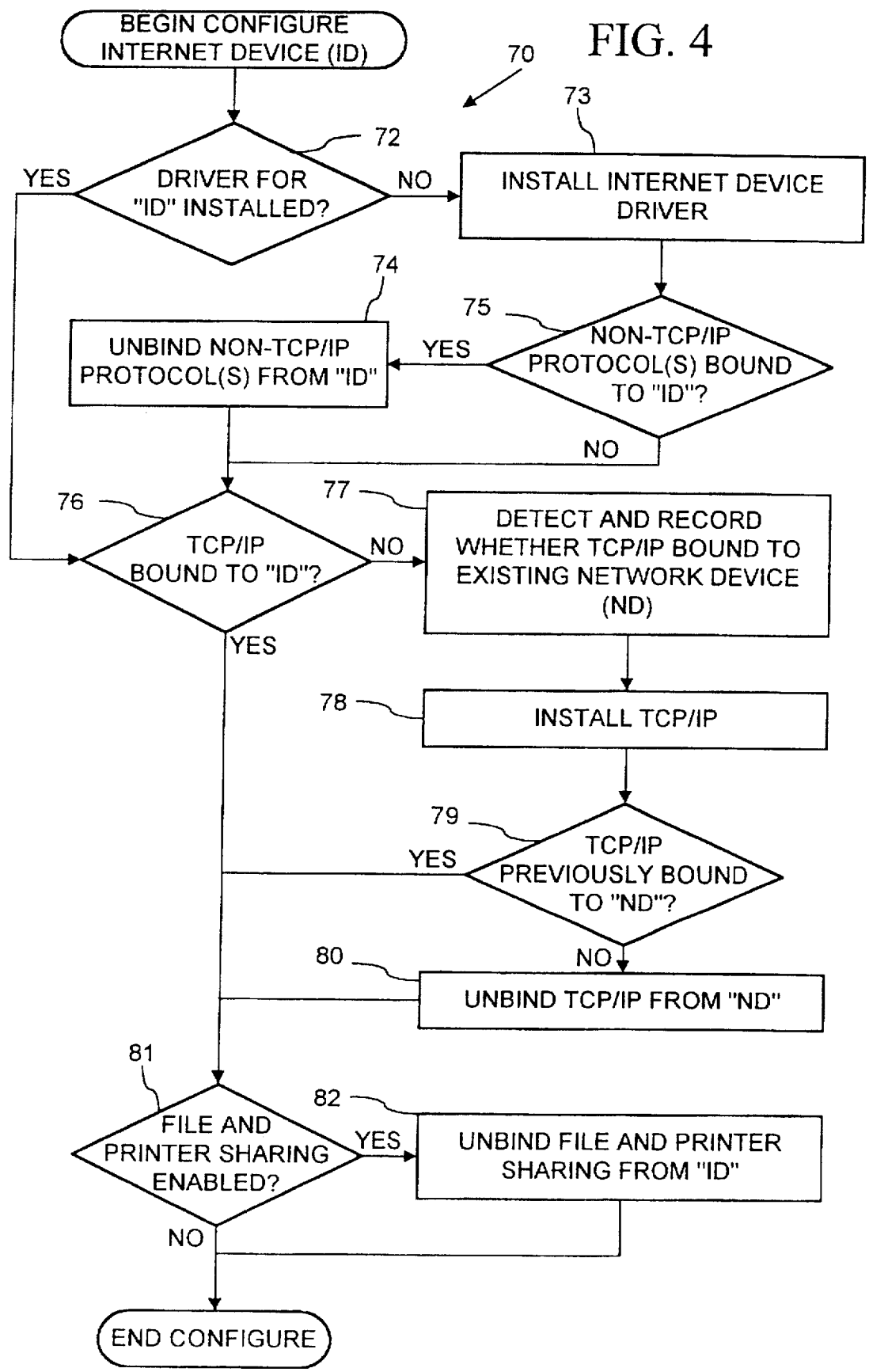
FIG. 4 is a flow diagram of set-up process according to the illustrated embodiment of the invention for configuring a connection such as shown in FIG. 2.

Referring now to FIG. 4, an Internet set-up automation software 150 (FIG. 3) (also referred to as the "Internet Set-up Wizard") in the illustrated embodiment of the invention initially configures the network software configuration 50 as shown in FIG. 2 according to a configure Internet device process 70 to provide a dial-up connection to the Internet for the network application 52 (FIG. 2). Although the process 70 in the illustrated embodiment configures the network software for connecting to the Internet with a dial-up device 54 (FIG. 2), alternative embodiments can configure the network software to connect to the Internet with a dedicated connection network device.

The Internet set-up automation software 150 generally is run when the network application 52 or any other network application that accesses the Internet is first installed on the computer system 20 (FIG. 1). The Internet set-up automation software 150 can be run after the network software already has been configured for the network device 55 (hereafter the "existing network device") which connects with another computer network, such as an internal corporate local area network (LAN). According to the illustrated embodiment of the invention, the process 70 configures the network software for the dial-up network device 54 (FIG. 2) so as to avoid disturbing an existing configuration of the network software for the existing network device 55.

Figure 9:
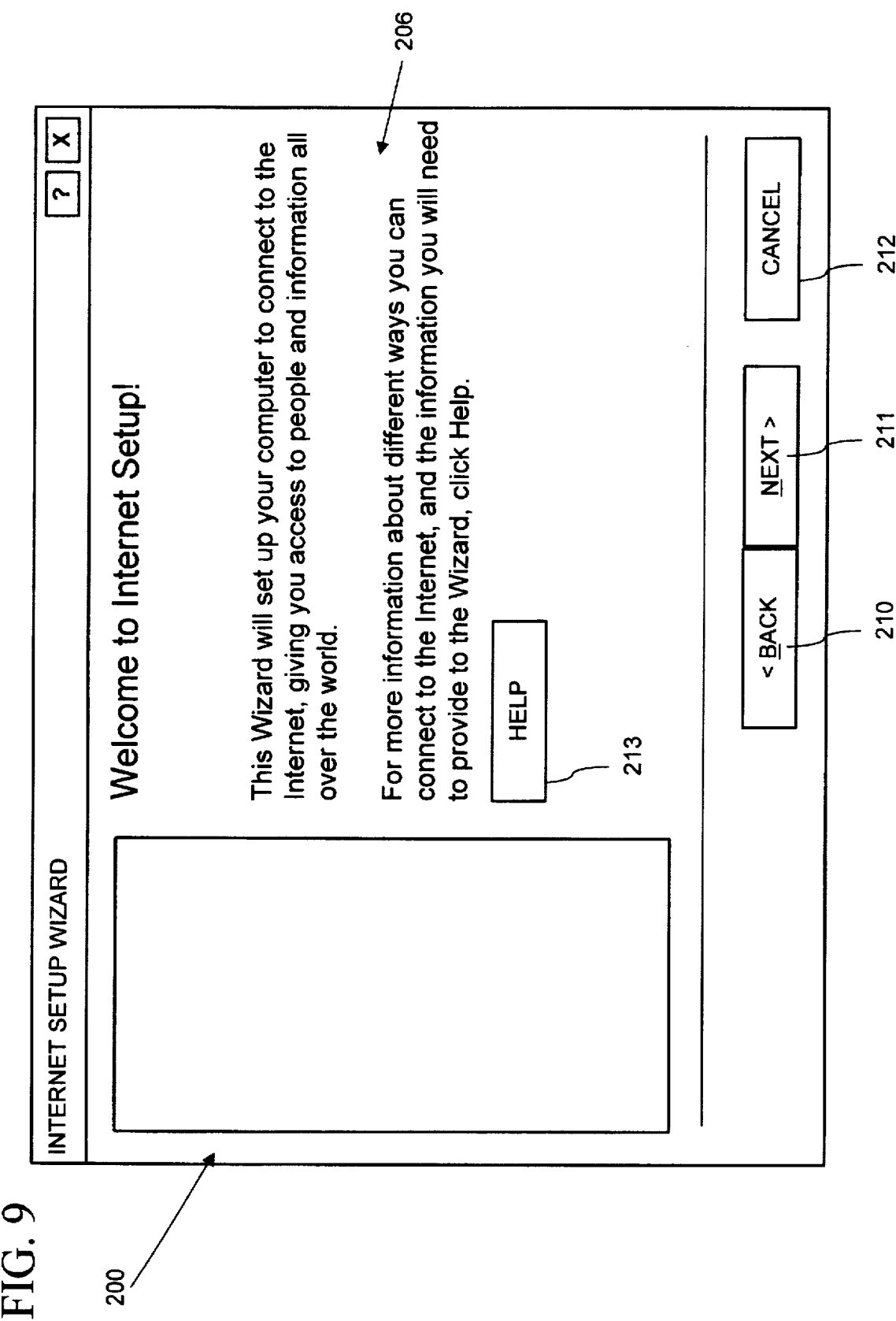
FIGS. 9–11 are views of a sequence of dialogs for the Internet set-up automation of FIG. 3.
Figure 10:
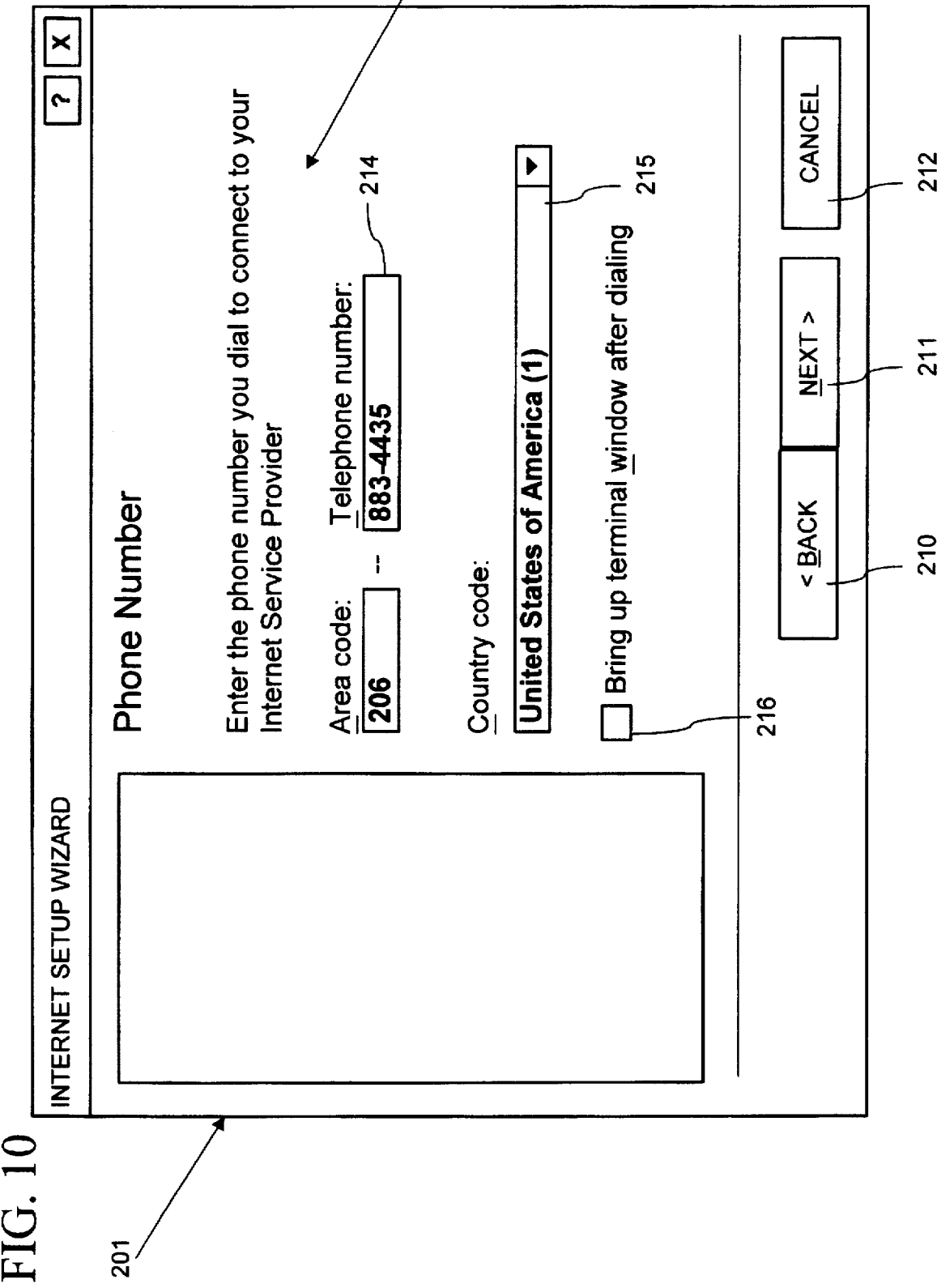
Figure 11:
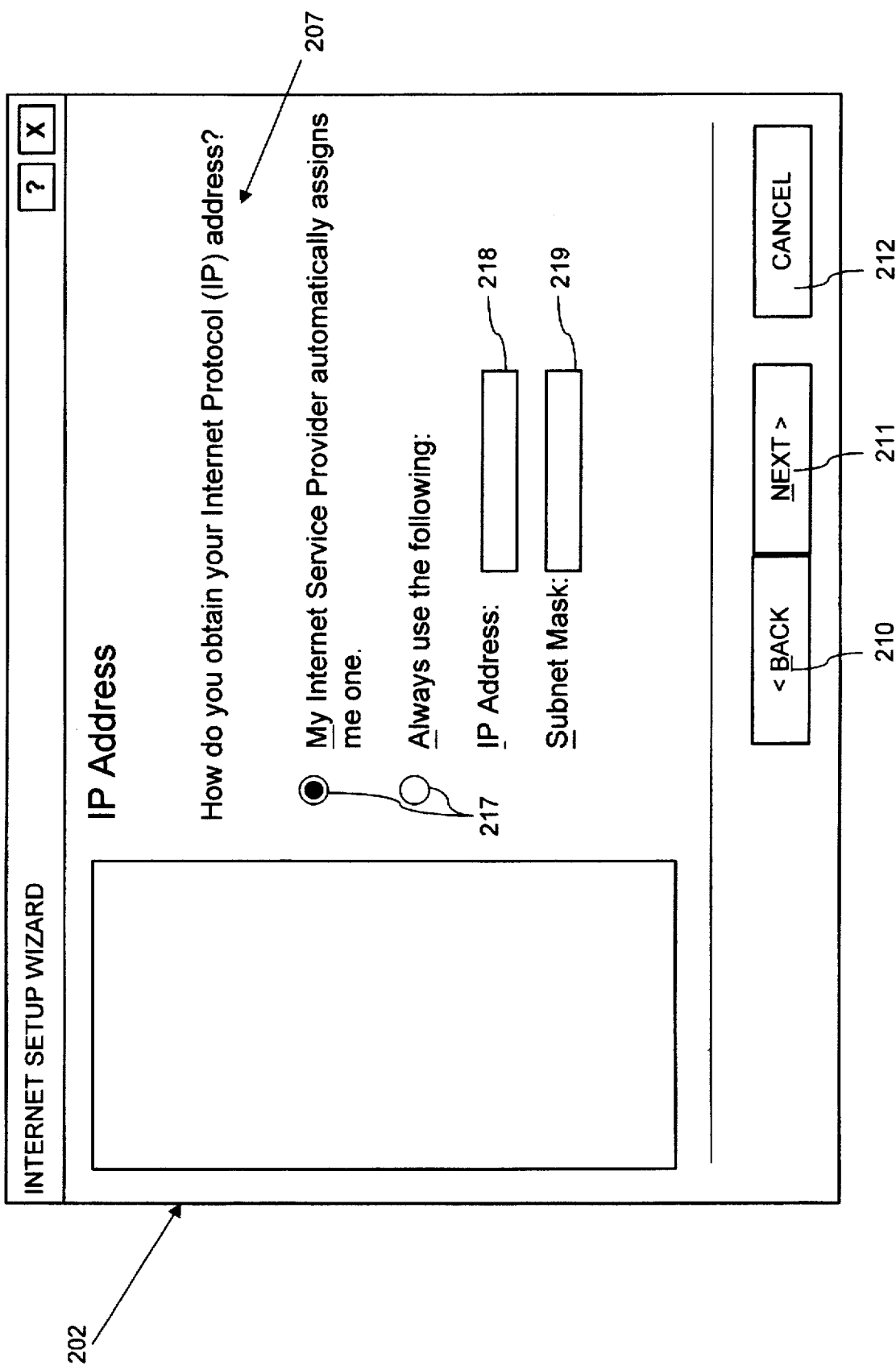

The Internet set-up automation software 150 generally has a two phase operation. In a first phase, the Internet set-up automation software 150 displays a sequence of dialogs 200–202 (FIGS. 9–11) which comprise textual prompts 206–208 that request certain configuration information from the user and user interface controls 210–219 which the user manipulates using an input device 28 of the computer system 20 (FIG. 1) to input the configuration information. The configuration information includes various parameters defining the dial-up connection to be used for connecting to the Internet, such as a telephone number of an Internet access service provider's Internet server computer, and communications parameters of the server computer. In a second phase of operation, the Internet set-up automation software 150 configures the network software for connecting to the Internet using the dialup device 54 according to the configuration information specified by the user. The Internet set-up automation software 150 performs the configure Internet device process 70 in this second phase so as to avoid disturbing the network software configuration for the existing network device 55.

In the Windows 95 operating system used in the illustrated computer system 20 (FIG. 1), the network software is configured by installing software modules (e.g., the network software components such as the network programming interface 58, the network protocols 60-61 and the network device drivers 64–65) into the secondary memory 42 (FIG. 1) and setting entries in a system registry. The system registry is a database stored as a file in the secondary memory 42 and used in the Windows 95 operating system for storing hardware and software configuration information. The Windows 95 operating system includes functions accessed by calls to a set of system application programming interfaces (APIs) which allow querying and deleting system registry entries, and installing the modules of the network software. The system APIs used by the Internet set-up automation software 150 in the illustrated process 70 are summarized in the following table 1.

TABLE 1

| System APIs Used in Internet Set-up Process 70. | |
|---|---|
| Action | System API used |
| Determine list of existing network devices | DiGetClassDevs |
| Install software for a network device | DiCallClassInstaller |
| Determine list of protocols bound to a network device | Registry APIs (RegOpenKey, RegQueryValueEx, RegCloseKey, et al) |
| Unbind or delete a protocol from a network device, or unbind file sharing from a protocol | Registry APIs (RegOpenKey, RegQueryValueEx, RegCloseKey, et al) |

At a first step 72 of the process 70, the Internet set-up automation software 150 checks whether the driver (e.g., dial-up adapter driver 64 of FIG. 2) of the device (hereafter "Internet device," e.g., dial-up device 54 of FIG. 2) to be used for connecting to the Internet has been installed. This is done in the illustrated process 70 by calling a system API named "DiGetClassDevs" (hereafter referred to as the "get class devices API") in the Windows 95 operating system which returns a list of network device drivers presently installed in the computer system 20. The Internet setup automation software 150 determines whether the driver of the Internet device is installed by calling the get class devices API and checking for the Internet device's driver in the list of installed network device drivers returned by the API call. If the Internet device's driver is not yet installed, the Internet set-up automation software 150 proceeds to install the driver in steps 73-75. Otherwise, the process 70 continues to a step 76.

In some embodiments of the invention, the steps 72–73 can be simplified to check for and install the internet device driver only if a dial-up device (e.g., the modem 54) is to be used for connecting to the Internet, and not if a dedicated connection network device (e.g., a network adapter card) is used. This may be done because, in the Windows 95 operating system, modems generally all can use a same driver (called the "dial-up adapter"). On the other hand, dedicated connection network devices require unique device drivers which are often installed and configured differently. The process 70 in such alternative embodiments therefore can require that the user first install and configure such dedicated connection network devices before running the Internet set-up automation, so that the Internet set-up automation is simplified.

At step 73, the Internet set-up automation software 150 installs the driver 64 for the Internet device 54. This is done in the illustrated process 70 by calling a system API named- "DiCallClassInstaller" (referred to hereafter as the "call class installer API") in the Windows 95 operating system. This API call causes the Windows 95 operating system to install the driver 64, and also automatically to bind to the Internet device any network protocols (e.g., a NetBEUI or IPX/SPX network protocol 61) that are bound to any existing network device 55. Thus, if there is an existing network device which has network protocols other than the TCP/IP protocol bound to it, such other network protocols also will be bound to the Internet device 54 when that device's driver 64 is installed. Since only the TCP/IP protocol 60 is needed for communicating on the Internet, these other protocols are not likely to be used where the Internet device is being installed for the first time (and has not been previously installed with other network protocols for use in connecting to other networks) as determined from step 72.

At step 74, the Internet set-up automation software 150 therefore checks whether any protocols other than TCP/IP have been bound to the Internet device. If such other protocols are bound to the Internet device, the Internet set-up automation software 150 unbinds these protocols from the Internet device at step 75. Otherwise, the process 70 continues to step 76. Thus, the process 70 binds only the TCP/IP protocol 60 to the Internet device 54 even if the Internet device driver 64 is installed while non-TCP/IP protocols are bound to an existing network device.

In the Windows 95 operating system, the network protocols 60–61 are bound to the network devices 54–55 by setting entries in a system registry associated with the device drivers 54–55. The values of entries in the system registry can be queried, deleted and modified by calling a set of registry APIs, named "RegOpenKey," "RegQueryValueEx," "RegCloseKey," etc. In the illustrated process 70, the Internet set-up automation software 150 determines whether non-TCP/IP protocols are bound to the Internet device at the step 74 by calling these registry APIs to query the values of entries in the system registry related to the network protocols bound to the Internet device. For each protocol other than the TCP/IP protocol, the Internet set-up automation software 150 unbinds the protocol from the Internet device at step 75 by calling Registry APIs to delete the system registry entries for binding that protocol to the Internet device.

At the step 76, the Internet set-up automation software 150 checks whether the TCP/IP protocol 60 is yet bound to the Internet device 54. In general, where the Internet device was just installed at step 73 of the process 70, the TCP/IP protocol 60 is bound to the Internet device driver only if it previously was bound to an existing network device. Again, the Internet set-up automation software 150 determines which protocols are bound to the Internet device 54 by querying the system registry with calls to the registry APIs.

If the TCP/IP protocol 60 is not yet bound to the Internet device driver 64, the Internet set-up automation software 150 continues to steps 77–80 with installing and binding the TCP/IP protocol to the Internet device driver while preserving the configuration of the network software for the existing network devices. Otherwise, the process 70 proceeds to a step 81.

At step 77, the Internet set-up automation software 150 detects for each existing network device (e.g., the network device 55) whether the TCP/IP protocol is bound to that device, and records that fact as a temporary variable. As discussed previously, the Internet set-up automation software 150 determines which network devices are installed by calling the get class devices API, and detects that the TCP/IP protocol is bound to the particular device by calling the registry APIs to query registry entries for binding network protocols to the device.

At step 78, the Internet set-up automation software 150 then installs the TCP/IP protocol 60. In the illustrated process 70, the Internet set-up automation software 150 calls the call class installer API to have the TCP/IP protocol installed. When the Windows® 95 operating system installs the TCP/IP protocol 60 in response to the call, it automatically binds the TCP/IP protocol to each network device 54–55 then installed in the computer system 20 (FIG. 1). Thus, the TCP/IP protocol is bound to not just the Internet device 54, but also to the existing device 55. Such change to the network software configuration of the existing network devices for other computer networks, however, could cause failure of the computer system 20 to connect to the other computer networks.

In the process 70, the Internet set-up automation software 150 avoids disturbing the network software configuration of the existing network devices by unbinding the TCP/IP protocol at steps 79–80 if the TCP/IP protocol was not originally bound to the network device (as detected and recorded at step 77 immediately prior to installing the TCP/IP protocol). Again, the Internet set-up automation software 150 unbinds the TCP/IP protocol by calling the registry APIs to delete the entries from the system registry for binding the TCP/IP protocol to the existing network device 55.

Finally, at steps 81–82, the Internet set-up automation software 150 determines whether the file and printer sharing option is enabled for the instance of the TCP/IP protocol 60 bound to the Internet device 54. (If more than one network device has a network protocol bound to it, each network device can have a different version of a network protocol bound to it, referred to herein as an "instance" of that protocol.) The file and printer sharing option also is configured by setting a system registry entry (also referred to as a registry "key"). The Internet set-up automation software 150 therefore detects that file and printer sharing is enabled for the Internet device's instance of the TCP/IP protocol 60 by querying the entry with calls to the registry APIs.

As discussed previously, the file and printer sharing option enables the files stored in the memory system 26 (FIG. 1) and any printer attached to the computer system 20 (FIG. 1) to be accessed from another computer which is networked with the computer system 20. Thus, when the network software is configured with file and printer sharing enabled for the Internet device, the files and printer of the computer system 20 are exposed to access from the Internet while the computer system is connected to the Internet. The file and printer sharing option is enabled by default for the instance of the TCP/IP protocol bound to the Internet device 54 if the option was previously enabled for an instance of the TCP/IP protocol bound to an existing network device (e.g., the network device 55).

If the Internet set-up automation software 150 detects that file and printer sharing is enabled for the Internet device's instance of the TCP/IP protocol, the automation software unbinds the file and printer sharing option at step 82. In the illustrated process 70, the file and printer sharing option is unbound by deleting the system registry entry for binding file and printer service to the Internet device using the registry APIs.

The process 70 thus installs and configures the network software for the Internet device to connect to the Internet without disturbing an existing network device's configuration, and prevents configuring the Internet device in a way that poses a security risk.

Dial-Time Security Check

Figure 5:
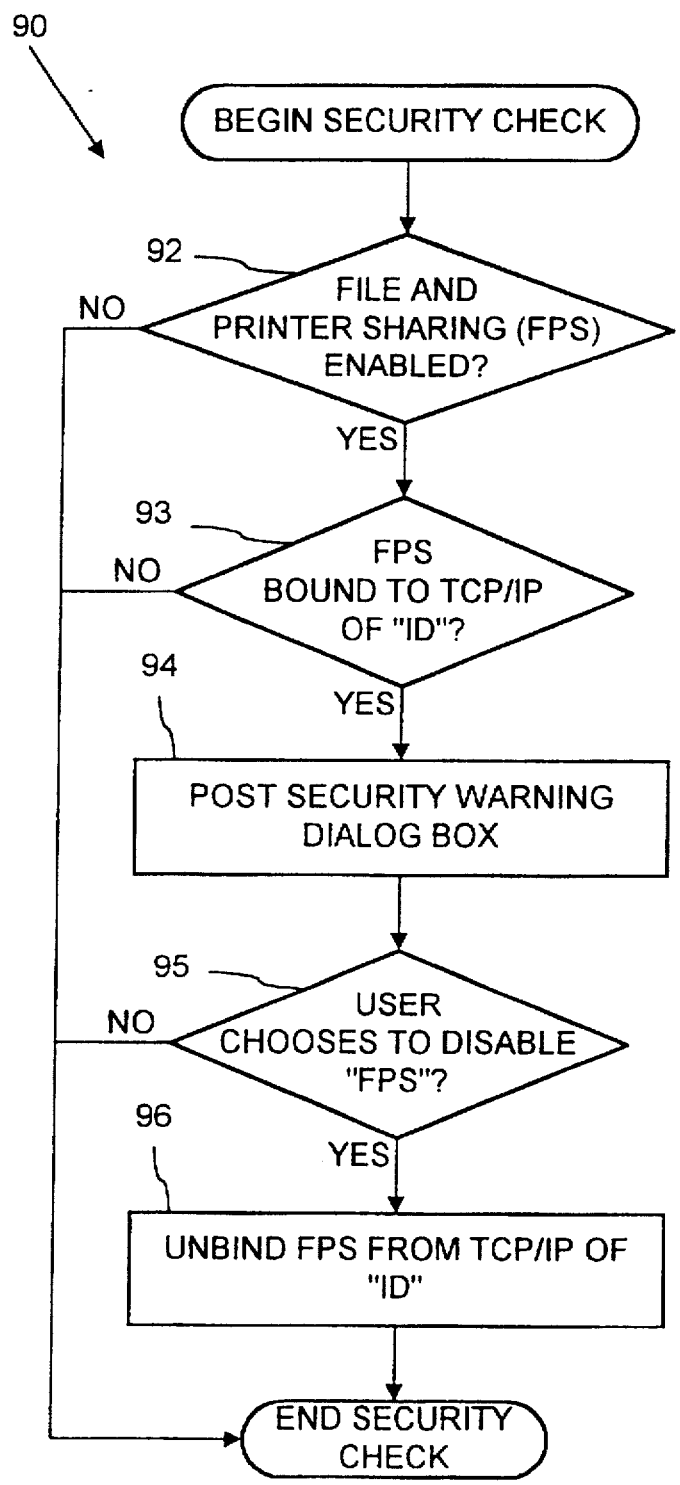
FIG. 5 is a flow diagram of a dial time security check method according to the illustrated embodiment of the invention for a connection to the Internet such as shown in FIG. 2.

With reference now to FIG. 5, a dial-time security checker 156 (FIG. 3) in the illustrated embodiment of the invention checks the network software configuration 50 at dial time in a security check process 90. The security check process 90 preferably is performed when the dialer 154 (FIG. 3) associated with the network software dials to connect to the Internet to prevent the security risk posed when file and printer sharing is enabled on the Internet device's instance of the TCP/IP protocol 60 (FIG. 2). Thus, if the network software configuration is inadvertently changed so that the file and printer sharing option is enabled on the Internet device 54 (FIG. 2), the dial-time security checker 156 prevents the user from unknowingly connecting to the Internet with this configuration.

In the illustrated embodiment of the invention, the network programming interface 58 (FIG. 2) includes an automatic dialer as the dialer 154 which automatically initiates dialing by the Internet device 54 (FIG. 2) when the network application attempts to communicate on the Internet with calls to the APIs of the network programming interface 58 and the computer system 20 is disconnected from the Internet. Alternatively, dialing can be initiated from another component of the network software. For example, the dialer 154 can be included as a component in the network application 52 and is responsible for dialing to connect to the Internet before the network application attempts to communicate on the Internet. The dialer 154 can be either automatically initiated or manually activated by the user. In any case, the dialing code preferably first calls the dial-time security checker 156 to initiate a security check of the network configuration prior to dialing. Since file and printer sharing can be set either deliberately or unintentionally by the user at any time, the dial-time security checker 156 preferably performs the security check process 90 every time the computer system 20 (FIG. 1) dials to connect to the Internet.

At a first step 92 of the security check process 90, the dial-time security checker 156 checks whether file and printer sharing services are enabled in the network software configuration 50 (FIG. 2). This check is performed in the illustrated process 90 by examining a system registry entry that controls enabling file and printer sharing services in the Windows 95 operating system. If the file and printer sharing services are enabled, the process 90 continues to a next step 93, otherwise, the dial-time security checker 156 ends the process 90 and returns to the dialing code.

At the step 93, the dial-time security checker 156 checks whether the file and printer sharing services are bound to the Internet device's instance of the TCP/IP protocol 60 (FIG. 2). In the Windows 95 operating system, this check is performed by locating the registry key for the TCP/IP protocol instance, which has the following form:

HKEY_LOCAL_MACHINE\Enum\Network\MSTCP\xxxx where xxxx is a four digit number. This registry key has a "Bindings" subkey which contains a list of network drivers that are bound to the TCP/IP protocol instance. If the name of any of these network drivers begins with the characters "VSERVER," then file and printer sharing services are bound to the TCP/IP protocol instance. The dial-time security checker 156 thus examines the names of the network drivers in the Bindings subkey list of the TCP/IP protocol instances registry key, and determines that file and printer sharing services are bound to the TCP/IP protocol instance if any of the names begin with "VSERVER." If file and printer sharing services are bound to the TCP/IP protocol instance, the process proceeds to a step 94. Otherwise, the dial-time security checker 156 ends the process 90 and returns to the dialing code.

Figure 6:
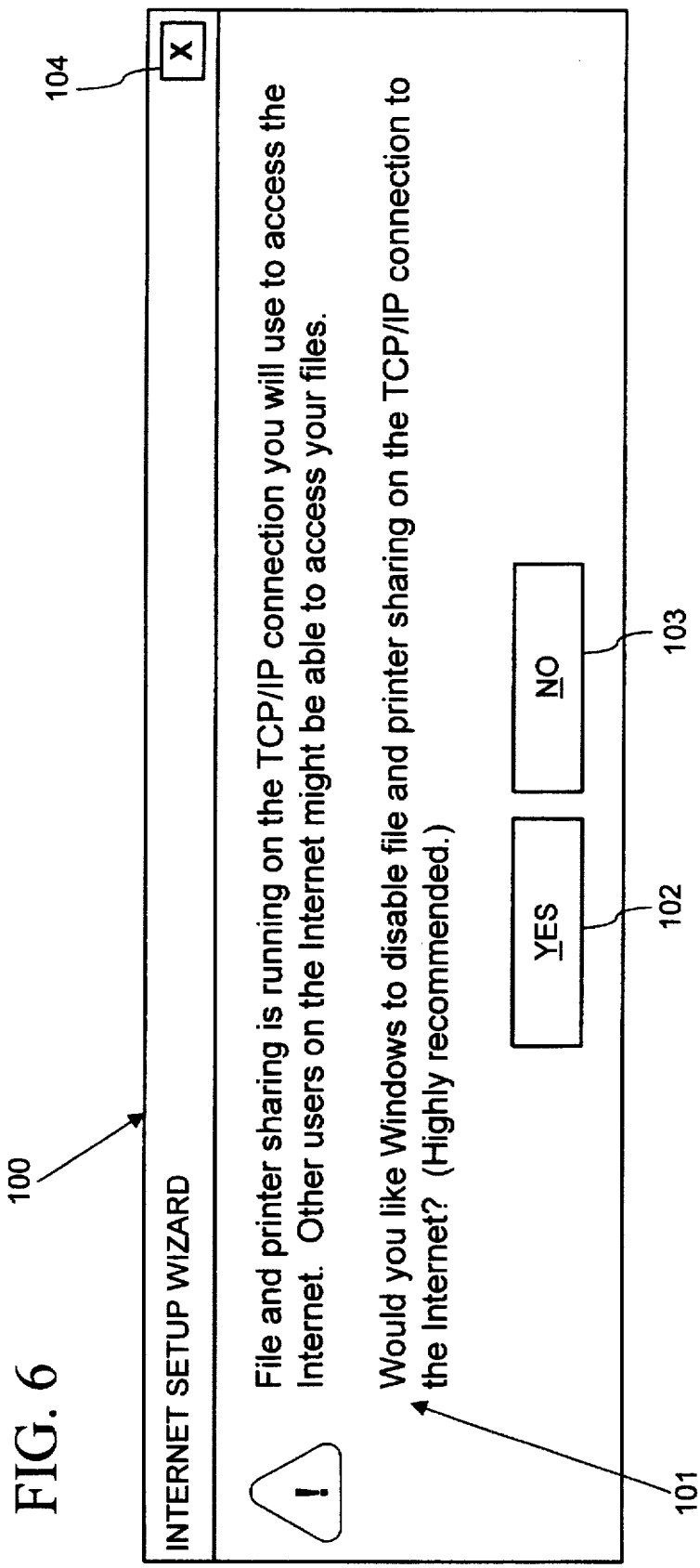
FIG. 6 is a view of a dialog box with controls to confirm disabling file and printer sharing on the connection in the dial time security check method of FIG. 4.

Referring also to FIG. 6, the dial-time security checker 156 posts a dialog box 100 at the step 94 (FIG. 5) which is displayed by the computer's output device 30 (FIG. 1) to the user. The illustrated dialog box 100 includes a graphic and text 101 which warns the user that a security risk exists due to the file and printer sharing being enabled on the Internet device 54 (FIG. 2), and offers to disable the file and printer sharing. The illustrated dialog box 100 further includes button controls 102–103 which the user activates with the input device 28 (FIG. 1) to respond "yes" or "no" to the offer. The dialog box 100 also includes a disabled close button 104 at an upper right corner as is standard for message dialog boxes in the Windows 95 operating system.

Referring again to FIG. 5, as shown at steps 95–96, the dial-time security checker 156 proceeds to unbind the file and printer sharing services from the Internet device's instance of the TCP/IP protocol 60 (FIG. 2) if the user responds affirmatively to the offer in the dialog box 100 to disable file and printer sharing. In the Windows 95 operating system, the file and printer sharing services are unbound from the TCP/IP protocol instance by deleting from the list of network drivers names in the Bindings subkey of the TCP/IP protocol instance's registry key any name beginning with "VSERVER." In order for this configuration change to take effect, it also is necessary to restart the Windows 95 operating system. In the illustrated embodiment, the dial-time security checker 156 returns a value which indicates a need to restart the operating system. Thus, the dialing code which called the dialtime security checker 156 can initiate restarting the operating system, such as by first displaying another dialog box which offers to restart the operating system, and automatically restarts the operating system if the user responds affirmatively.

If the user chooses not to disable file and printer sharing for the Internet device at step 95, the dial-time security checker 156 does not unbind the file and printer sharing services from the TCP/IP protocol instance 60 (FIG. 2). Since the dial-time security checker 156 has warned the user of the security risk posed by enabling file and printer sharing, the user is now knowingly connecting to the Internet with file and printer sharing enabled. The dial-time security checker 156 therefore ends the process 90 and returns to the dialing code.

Accordingly, the security check process 90 protects against the user inadvertently or unknowingly connecting to the Internet with file and printer sharing enabled, and disables file and printer sharing for the Internet if needed.

Dial-Time Configuration Check

Figure 7:
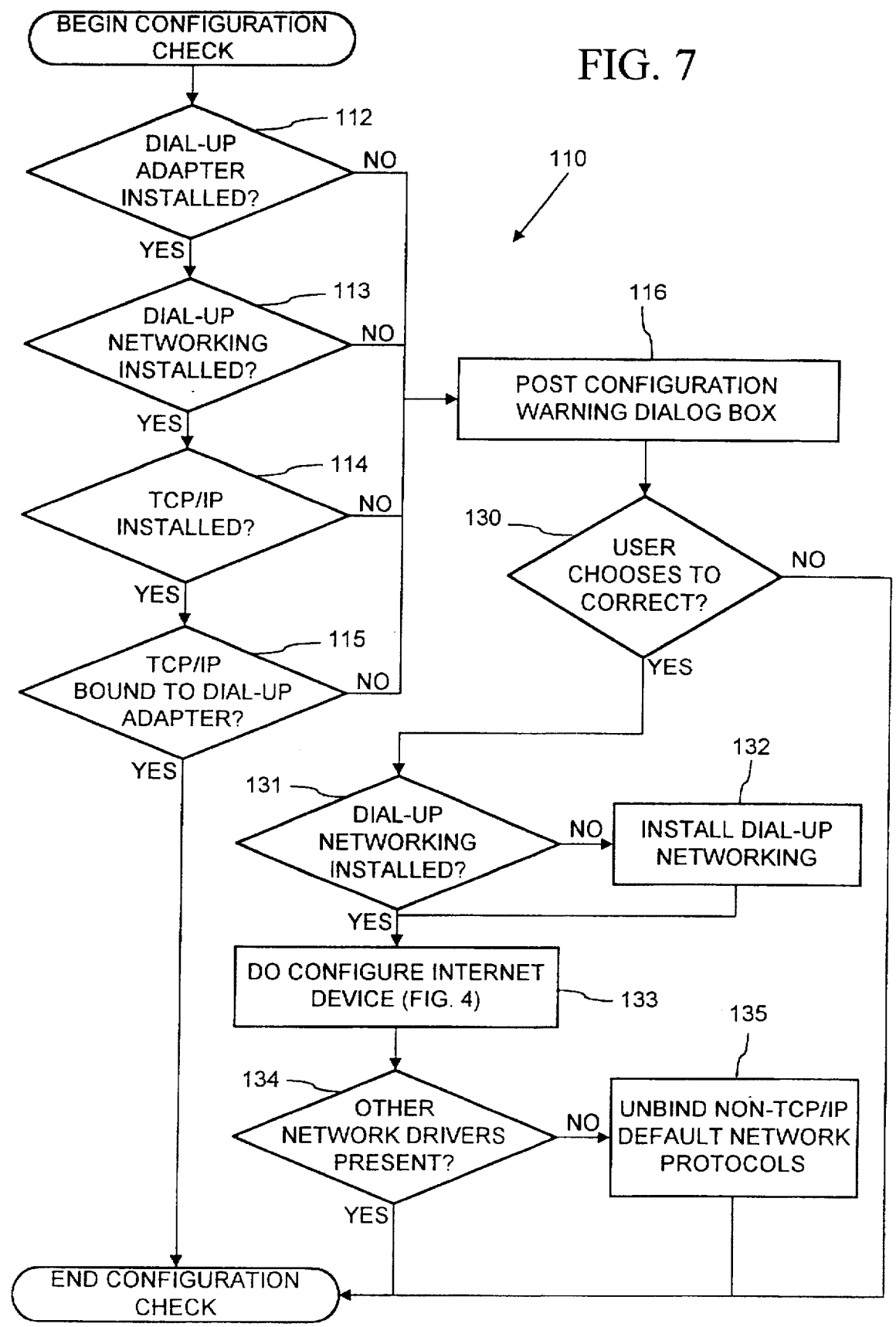
FIG. 7 is a flow diagram of a dial time configuration check method according to the illustrated embodiment of the invention for a connection to the Internet such as shown in FIG. 2.

Referring now to FIG. 7, a dial-time configuration checker 158 (FIG. 3) in the illustrated embodiment of the invention also checks the network software configuration 50

(FIG. 2) at dial time with a configuration check process 110. The dial-time configuration checker 158 preferably is called by the dialer 154 (FIG. 3) which establishes a connection to the Internet for the network application 52 (FIG. 2) in the network software architecture. Preferably, the dialer is an automatic dialer in the network programming interface (Windows sockets) 58, but alternatively can be implemented in another network software component such as the network application itself. The dial-time configuration checker 158 preferably is called to perform the configuration check process 110 each time that the network software dials to connect to the Internet. Preferably, the dial-time configuration checker 158 performs the configuration check process 110 when any Internet connection is being dialed by the network software. Alternatively, the configuration. check process 110 can be performed only when dialing a specific Internet access service provider.

The dial-time configuration checker 158 is responsible for ensuring that the network software is properly configured for connecting to the Internet. As described above, the Internet set-up automation software 150 initially configures the network software for connecting to the Internet. However, it is possible that the user will manually change the network software configuration 50 (FIG. 4) at some point thereafter in such a way that it is no longer possible to connect to the Internet. This can cause dialing to connect to the Internet to fail, often with only a cryptic error message. Since the user is often unaware of the cause of the failure, or even that the configuration was changed, this can be very confusing to the user.

The dial-time configuration checker 158 examines the network system configuration 50 (FIG. 4) in the configuration check process 110 and checks that each of the network software modules (e.g., the TCP/IP network protocol 60, the Internet device driver 64, etc.) are installed and properly configured to connect to the Internet. If the configuration does not appear correct, the dial-time configuration checker 158 warns the user and offers to correct the configuration 50. If the user chooses to have the configuration corrected, the checker 158 installs any needed network software modules and/or makes appropriate changes to the configuration 50. The dialer 154 for the network software 50 can then continue with dialing the Internet.

In a first sequence of steps 112–115, the dial-time configuration checker 158 checks whether the network software configuration 50 (FIG. 3) is correct. In the illustrated process 110, the dial-time configuration checker 158 checks the following conditions: that the dial-up device driver 64 (FIG. 2) is installed (step 112), that dial-up networking (optional operating system files, e.g., the remote network access (RNA) of Windows 95) are installed (step 113), that the TCP/IP protocol is installed (step 114), and the TCP/IP protocol is bound to the dial-up device 54 (step 115). If all these conditions are true, then the configuration is considered correct in the illustrated embodiment and the configuration check process 110 ends. Otherwise, if any of the conditions are false, then the configuration is considered suspect and the configuration checker 158 proceeds to step 116.

Figure 8:
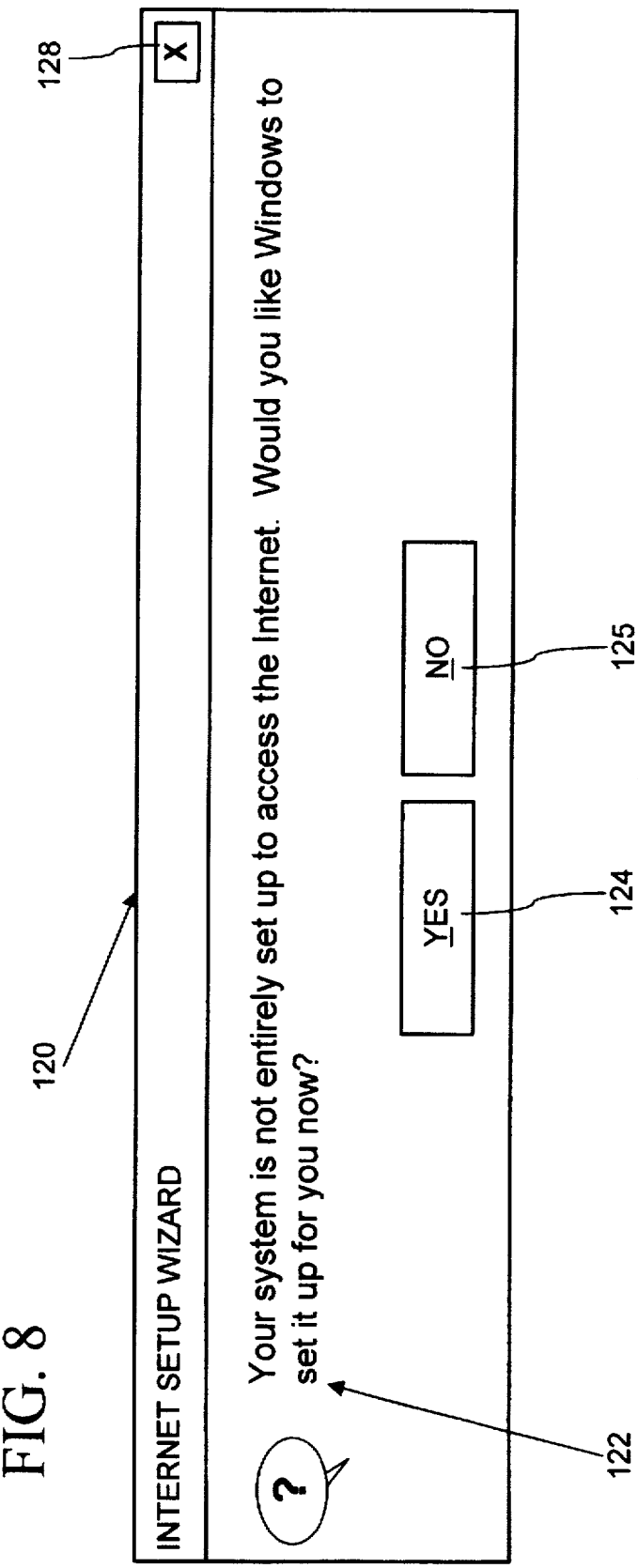
FIG. 8 is a view of a dialog box with controls to confirm disabling file and printer sharing on the connection in the dial time security check method of FIG. 6.

At step 116, the configuration checker 158 posts a dialog box 120 shown in FIG. 8 which is displayed on the computer's output device 30 (FIG. 1) to the user. The illustrated dialog 120 includes a graphic and text 122 which warn the user that the network software configuration is not correct, and offer to correct the configuration. The illustrated dialog box 120 further includes button controls 124–125 which the user activates with the input device 28 (FIG. 1) to respond "yes" or "no" to the offer. The dialog box 120 also includes a close button 128 at an upper right corner as is standard for dialog boxes in the Windows 95 operating system.

As shown at step 130 of FIG. 7, the configuration checker 158 (FIG. 3) proceeds to correct the network software configuration in steps 131–135 if the user chooses to correct the configuration by responding affirmatively to the offer in the dialog box 120 (FIG. 8). Otherwise, if the user chooses not to have the configuration 50 corrected, the configuration check process 110 ends.

At step 131, the configuration checker 158 first determines whether the dial-up networking is installed. If dial-up networking is not installed, the configuration checker 158 installs dial-up networking, which are optional operating system files, by copying these files into the secondary storage 42 (FIG. 1) at step 132.

At step 133, the configuration checker 158 then performs the steps 72–82 of the configuration process 70 shown in FIG. 4 and described above. This includes installing the dial-up device driver 64 (FIG. 2), installing the TCP/IP protocol 60, and binding the TCP/IP protocol to the dial-up device 54 while avoiding disturbing the configurations of any other existing network adapter devices and avoiding configuring the dial-up device with file and printer sharing enabled.

At step 134, the configuration checker 158 then checks for a situation where the dial-up device driver 54 is just installed and no other network adapter cards are presently installed (i.e., the network adapter driver 65 of FIG. 2 is not installed). In such case, installing the dial-up device driver with the above-described call class installer API of the Windows 95 operating system causes unneeded network protocols to be installed and bound to the dial-up device 54 by default. At step 135, the configuration checker 158 then unbinds protocols other than the TCP/IP protocol 60 from the dial-up device 54. The configuration check process 110 then ends.

By performing the configuration check process 110 immediately prior to dialing each Internet connection, the dial-time configuration checker 158 ensures that the network software configuration 50 is correct when dialing to the Internet. The network software configuration is thus made more robust. This reduces network software service costs and avoids user confusion and frustration resulting from inadvertent or unknown configuration changes.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A method of configuring network software on a computer for securely connecting to a remote public computer network, the network software having a facility for sharing local resources of the computer, the facility having a sharing setting controlling access to said resources from the remote public computer network, the method comprising:

checking whether said setting is enabled for a connection to the remote public computer network; and if said setting is enabled for said connection, disabling said setting for said connection, thereby preventing access from the remote public computer network to said resources.

2. The method of claim 1 wherein said access comprises access to a file or printer.

3. The method of claim 1 wherein enabling said setting for the connection comprises binding said setting to a network device used for connecting to the remote public computer network, the method comprising:

checking a system registry entry for binding said setting to the network device; and if the system registry entry shows that said setting is bound to the network device, unbinding said setting from the network device.

4. The method of claim 1 comprising:

posting a dialog to a user of the computer having a warning that said setting is enabled for the connection to the remote public computer network;

prompting the user to choose whether to disable said setting for said connection;

receiving input from the user; and disabling said setting for said connection if the user chooses to disable said sharing for said connection.

5. The method of claim 4 wherein said connection is a dial-up connection, the method comprising:

dialing on a dial-up device to form said connection to the remote public computer network;

performing the step of checking at the time of dialing.

6. The method of claim 1 comprising:

configuring the network software to connect to the remote public computer network; and performing the step of checking at the time of configuring.

7. A method of configuring network software on a computer for connecting to a remote computer network as well as connecting to a second computer network, comprising:

detecting whether a network protocol for communicating on the remote computer network is bound to a device of the computer for connecting to the remote computer network;

if the network protocol is not bound to the device for connecting to the remote computer network, performing the steps of:

recording whether the network protocol is bound to a device of the computer for connecting to the second computer network;

installing the network protocol to bind to the devices; and unbinding the network protocol from the device for connecting to the second computer network if the network protocol was recorded as not previously bound to the device for connecting to the second computer network.

8. The method of claim 7 wherein binding the network protocol to one of the devices comprises setting a system registry entry for that device and wherein unbinding the network protocol to one of the devices comprises clearing a system registry entry for that device.

9. The method of claim 7 comprising:

installing a driver for the device for connecting to the remote computer network, said installing causing network protocols which are bound to the device for connecting to the second computer network also to be bound to the device for connecting to the remote computer network; and for each network protocol bound to the device for connecting to the remote computer network, unbinding that network protocol from the device for connecting to the remote computer network if that network protocol is other than the network protocol for communicating on the remote computer network.

10. The method of claim 7 comprising:

detecting whether file and printer sharing services are bound to the device for connecting to the remote computer network; and unbinding said sharing services from the device for connecting to the remote computer network if said services are bound to the device for connecting to the remote computer network.

11. A method of configuring network software on a computer having a dial-up device for connecting to a remote computer network, comprising:

initially configuring the network software for connecting to the remote computer network by dialing with the dial-up device;

checking whether the network software is correctly configured for connecting to the remote computer network at a time of dialing on the dial-up device to connect to the remote computer network; and reconfiguring the network software for connecting to the remote computer network with the dial-up device if the network software is not correctly configured for connecting to the remote computer network.

12. The method of claim 11 wherein the step of checking comprises:

checking a plurality of conditions comprising that a driver for the dial-up device is installed, that a network protocol for communicating on the remote computer network is installed, and that the network protocol is bound to the dial-up device; and determining that the network software is not correctly configured for connecting to the remote computer network with the dial-up device if any of said conditions are false.

13. The method of claim 12 wherein the conditions further comprise that an operating system dial-up networking service is installed.

14. The method of claim 11 comprising, when said checking indicates that the network software is not correctly configured for connecting to the remote computer network:

posting a dialog to a user of the computer having a warning that the network software is not correctly configured for connecting to the remote computer network;

prompting the user to choose whether to reconfigure the network software for connecting to the remote computer network;

receiving input from the user; and reconfiguring the network software for connecting to the remote computer network with the dial-up device if the user chooses to reconfigure.

15. The method of claim 11 wherein the step of reconfiguring the network software comprises:

installing a driver for the dial-up device if the driver is not installed; and where installing the driver causes network protocols other than a network protocol for communicating on the remote computer network to be bound to the dial-up device, unbinding said other network protocols from the dial-up device.

16. The method of claim 11 wherein the step of reconfiguring the network software comprises:

installing a network protocol for communicating on the remote computer network if the network protocol is not installed; and where installing the network protocol causes the network protocol to be bound to any network adapter devices of the computer other than the dial-up device, unbinding the network protocol from said other network adapter devices.

17. The method of claim 11 wherein an operating system of the computer provides a service for network sharing of a local resource, the step of reconfiguring the network software comprising:

unbinding said service from the dial-up device if said service is bound to the dial-up device.

18. A remote public computer network set-up automation software for configuring network software on a computer to connect to a remote public computer network with a dial-up device and contained on a computer readable data storage medium, comprising:

code for detecting that a network protocol for communicating on the remote public computer network is bound to the dial-up device;

code for recording whether the network protocol also is bound to any network adapter devices other than the dial-up device;

code for installing the network protocol, said installing causing the network protocol to be bound to the dial-up device; and code for unbinding the network protocol from those of said other network adapter devices which were recorded as not having the network protocol bound to the network adapter device.

19. The remote public computer network set-up automation software of claim 18 wherein an operating system of the computer provides a service for network sharing of a local resource, the remote public computer network set-up automation software comprising:

code for unbinding said service from the dial-up device if said service is bound to the dial-up device.

20. A dial-time security checker for securely configuring network software of a computer to connect to a remote public computer network with a dial-up device and stored on a computer readable data storage medium, comprising:

code for checking whether a network software service for network sharing a local resource of the computer is bound to the dial-up device at a time of dialing with the dial-up device to connect to the remote public computer network; and code for unbinding said service from the dial-up device, thereby preventing access to the local resource from the remote public computer network.

21. A dial-time configuration checker for a computer having a dial-up device and a network software configured to connect to a remote public computer network with a dial-up device, the dial-time configuration checker stored on a computer readable data storage medium, comprising:

code for verifying that the network software is correctly configured to connect to the remote public computer network with the dial-up device at a time of dialing with the dial-up device to connect to the remote public computer network; and code for reconfiguring the network software to connect to the remote public computer network when the network software is verified not to be correctly configured to connect to the remote public computer network.

22. A method of configuring network software on a computer for securely connecting to a remote public computer network, the network software having a facility for sharing local resources of the computer, the facility having a configuration setting controlling access to said resources from the remote public computer network, the resources accessible to programs executing on the computer, the method comprising:

checking whether said setting is enabled for a connection to the remote public computer network; and if said setting is enabled for said connection, disabling said setting for said connection, thereby preventing access from the remote public computer network to said resources while said resources remain accessible to a plurality of the programs.

\* \* \* \* \*